F. L. CUTTER.
Lawn-Mower.
No. 223,889.          Patented Jan. 27, 1880.
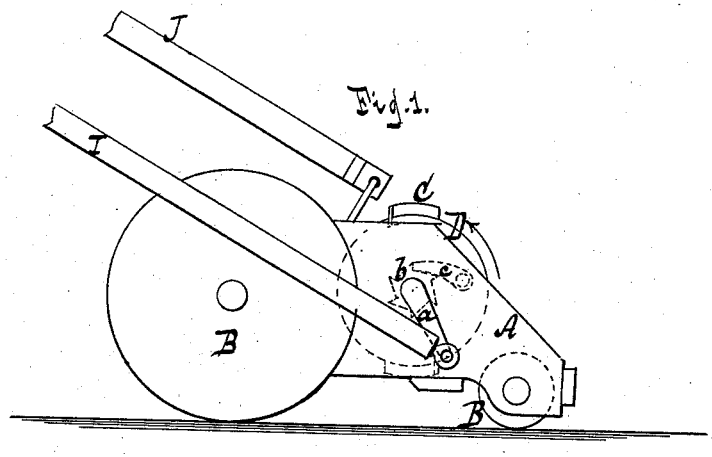
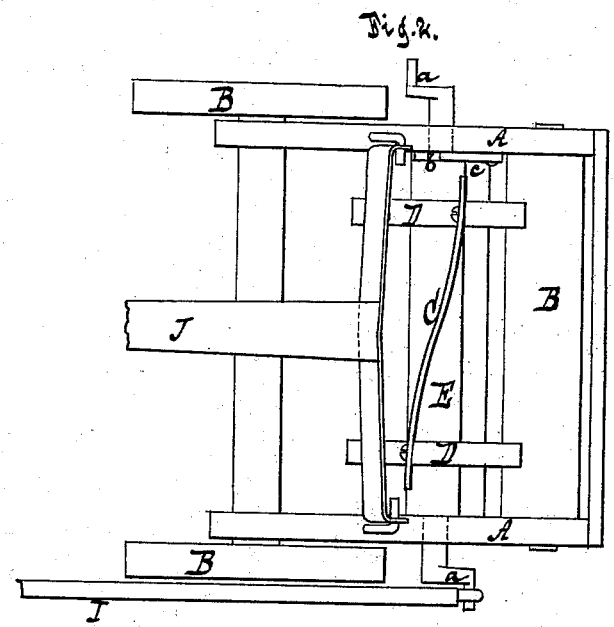
Witnesses
Otto Hufeland
William Miller
Inventor
Francis L. Cutter
by VanSantvoord & Hauff
his attorneys

UNITED STATES PATENT OFFICE.

FRANCIS L. CUTTER, OF BROOKLYN, NEW YORK.

LAWN-MOWER.

SPECIFICATION forming part of Letters Patent No. 223,889, dated January 27, 1880.

Application filed June 19, 1879.

*To all whom it may concern:*

Be it known that I, FRANCIS L. CUTTER, of Brooklyn, in the county of Kings and State of New York, have invented a new and useful Improvement in Lawn-Mowers, which improvement is fully set forth in the following specification, reference being had to the accompanying drawings, in which—

Figure 1 is a side view. Fig. 2 is a plan view.

Similar letters indicate corresponding parts.

This invention relates to lawn-mowers; and it consists in the combination, with a revolving cylinder provided with cutting-blades and the propelling-handle of a lawn-mower, of a crank-axle and a rod extending from the crank parallel with the propelling-handle, its outer end being free to move up and down to allow the hand of the operator to vary the position to reduce fatigue and aid in overcoming the dead-center, as will be more fully hereinafter described.

In the drawings, the letter A designates the frame, running on wheels or rollers B B, and propelled by means of the handle J.

C are knives or cutters fastened to disks D D, which disks are connected by the cylinder E. To this cylinder E is attached a crank, *a*. I prefer to have a crank on each side, so that the right or left hand can be used to work the machine. From this crank *a* runs a driving-rod, I, to within reach of the operator, who seizes the same and causes the knives G to revolve at the same time that he propels the machine by the handle J. The outer end of the handle J is free to move up and down, so that the hand of the operator can vary its position to reduce fatigue and aid in overcoming the dead-center.

In order to insure the knives being turned in the proper direction, I attach a ratchet-wheel, *b*, Fig. 1, to the cylinder E, into which wheel gears the detent *c*, thus allowing the knives to turn only in the direction of the arrow.

The advantages of this mower will readily be seen. The handle J is not weighted down by any mechanism, and is consequently light and easy to hold. The knives, not being driven by means of cogs, but moving independently of the forward motion of the mower, can be turned slowly or rapidly, as desired. In dispensing with cogs or other like connections I also gain much power, since no power is lost by friction, and also simplify the construction of the machine, thereby rendering the same cheap and durable.

Another advantage is that the rod I and handle J can be held in different positions, one being independent of the other.

I do not claim, broadly, a lawn-mower which is propelled by one hand and the cutting device operated by the other hand by means of a pulley-and-band connection with the cutters; and neither do I claim, broadly, pawls and ratchets for preventing back motion of the revolving cutters, as such features are not new; but

What I claim as new, and desire to secure by Letters Patent, is—

In combination with the revolving cylinder provided with cutting-knives and with the propelling-handle of a lawn-mower, the crank-axle *a* and rod I, extending from said crank parallel with the propelling-handle, its outer end being free to move up and down to allow the hand of the operator to vary the position to reduce fatigue and aid in overcoming the dead-center, substantially as specified.

In testimony that I claim the foregoing I have hereunto set my hand and seal this 14th day of June, 1879.

FRANCIS L. CUTTER. [L. S.]

Witnesses:
W. HAUFF,
CHAS. WAHLERS.